UNITED STATES PATENT OFFICE.

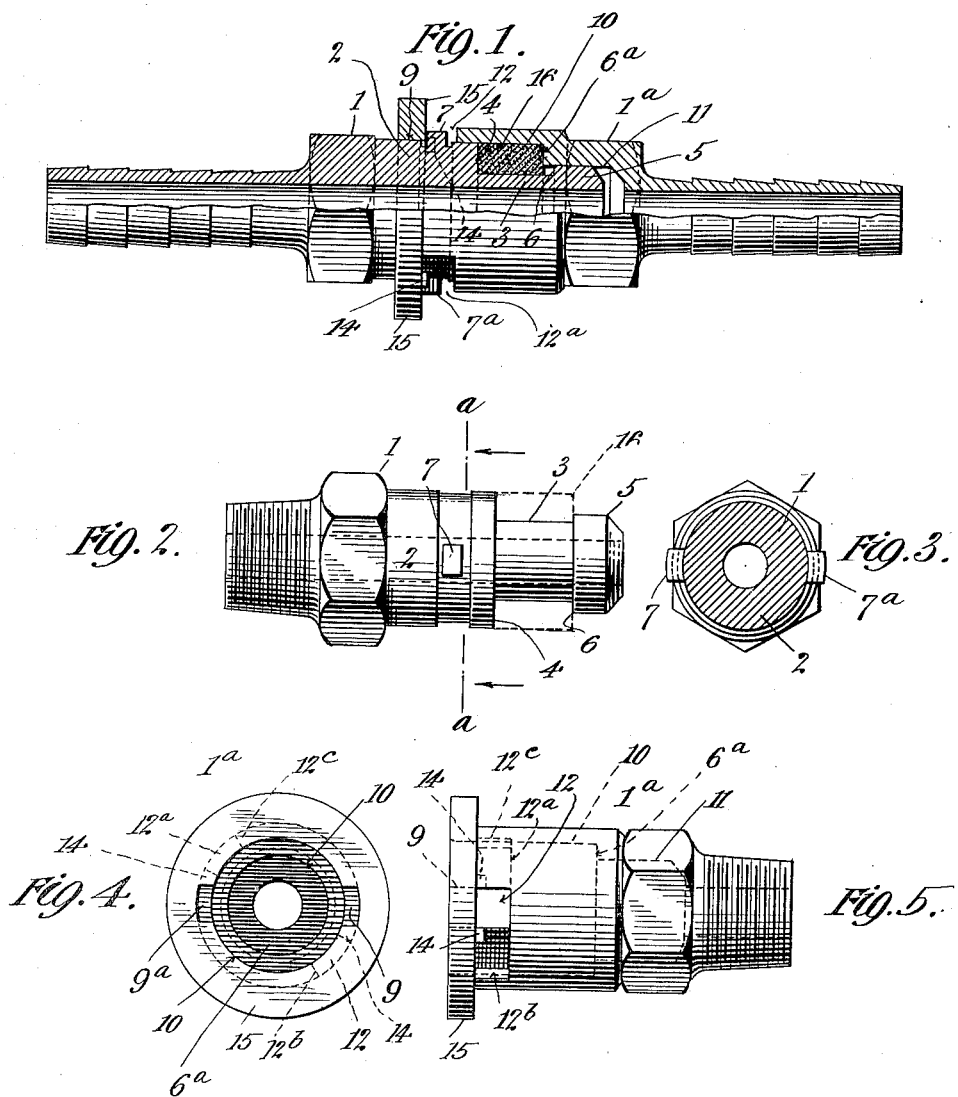

FREDERICK J. GLOVER, OF SILVIS, ILLINOIS.

PIPE-COUPLING.

1,037,238.  Specification of Letters Patent.  Patented Sept. 3, 1912.

Application filed December 14, 1910. Serial No. 597,366.

*To all whom it may concern:*

Be it known that I, FREDERICK J. GLOVER, of Silvis, county of Rock Island, and State of Illinois, have invented a new and useful Improvement in Pipe-Couplings, of which the following is a specification.

This invention relates to pipe, hose or like couplings, the object of the invention being to produce a coupling suitable for use in connection with air, gas, water or other fluids, which coupling will be simple in construction and composed of few parts; will effectually prevent the leakage of the fluid, and which may be easily coupled or uncoupled.

With these objects in view, my invention consists of a coupling comprising a male coupling member and a female coupling member adapted to be interlocked in coupled relations and embodying improved features of construction, which will be fully described in the specification and the novel parts pointed out in the claim.

In the accompanying drawings: Figure 1 is a view, partly in elevation and partly in longitudinal section, showing my improved coupling with the members connected. Fig. 2 is an elevation of the male member of the coupling. Fig. 3 is a transverse section on the line a—a of Fig. 2. Fig. 4 is an end view of the female member of the coupling. Fig. 5 is an elevation of the same.

Referring to the drawings: My improved coupling comprises a male member 1 and a female member 1ª, the latter being hollow and adapted to receive the male member, which in the coupling action is inserted in the female member and interlocked therewith in a manner to be hereinafter more fully described.

The members are formed each with an opening extending longitudinally therethrough for the passage of the fluid, and at their outer ends they are suitably formed to adapt them to be connected to the parts in connection with which the coupling is to be used. In Fig. 1, the outer ends of the members are formed with ribbed nipples to adapt the coupling to be connected with a flexible hose, while in Figs. 2 and 5 the members are shown as provided with threaded ends to adapt them to be connected to tanks, reservoirs, and the like.

The male member 1 is formed with an enlarged cylindrical portion 2, at the end of which is a reduced neck 3 separated from the enlarged portion by an annular shoulder 4, and at the end of this neck is a head 5, whose junction with the reduced neck, forms an annular shoulder 6 considerably less in height than the shoulder 4. About midway of the length of the enlarged cylindrical portion 2, there are provided two outwardly extending locking lugs 7 and 7ª disposed at diametrically opposite points on the coupling member, and adapted to be received respectively by two similarly situated slots 9 and 9ª extending longitudinally for some distance into the inner end of the female member. The female member is formed with an enlarged internal bore 10 and a reduced bore 11 adapted to receive respectively, the enlarged cylindrical portion 2 and the head 5 of the male member, as shown in Fig. 1. The slots 9 and 9ª in the female member communicate respectively with recesses 12 and 12ª extending through the side of the female member a short distance circumferentially in opposite directions, which recesses are adapted to receive the locking lugs on the male member when the latter is turned slightly within the female member after the lugs have been entered in the longitudinal slots, such turning movement causing the locking lugs to pass laterally into the recesses until arrested by contact with the end walls 12ᵇ and 12ᶜ of the recesses. At the side of each slot, where it adjoins its recess, a stop lug 14 is arranged and adjoins a flange 15 fixed to the inner end of the female member, this flange constituting one of the side walls of each recess. The locking lugs on the male member are adapted, when the members are in full coupled condition, to seat in between the stop lugs and the ends of the recesses, and to bear against the forward walls of the recesses formed by the flange 15, in which position of the parts the stop lugs by their engagement with the locking lugs will prevent the latter from shifting laterally in the recesses. In order to seat the locking lugs in their locking positions, they are entered in the slots in the female member and moved sufficiently far in a longitudinal direction to clear the stop lugs, whereupon the male member is turned slightly within the female member, with the result that the locking lugs will be carried past the respective stop lugs, and finally the male member is drawn outward relatively to the female member in a longitudinal direction, thereby seating the locking lugs between the stop lugs and end walls of the recesses and against the front walls of the same. In this position of the parts, the locking lugs cannot be again entered into the longitudinal slots without first moving the male member of the coupling longitudinally into the female member in order to cause the locking lugs to free the stop lugs.

In order that the parts may be held in coupled relations with no danger of accidental separation, and in order that a liquid-tight joint may be formed between the interfitting portions of the two members of the coupling, I provide a compressible gasket 16 of rubber or other similar elastic material, which gasket encircles the reduced neck 3 of the male member, and is held thereon from escape by the shoulder 4 at one end and by the head 5 at the other end. This gasket is of such diameter that when not under compression endwise, it will enter the enlarged bore of the female member snugly, a considerable portion of the end of the gasket being exposed beyond the head 5. This exposed portion of the end of the gasket is adapted, when the male member is inserted longitudinally into the female member, to contact with the annular shoulder 6ª on the female member, the continued longitudinal movement of the male member causing the gasket to be compressed endwise against said shoulder and causing it to expand radially so that its outer surface will bind firmly and fluid-tight against the interior of the enlarged bore of the female member. The longitudinal movement of the male member is continued until the locking lugs have passed or cleared the stop lugs, and then the male member is turned slightly within the female member to cause the locking lugs to travel in the lateral recesses and until, in their travel, they have passed or cleared the stop lugs in this direction, whereupon the parts being released by the hands, the expansion of the compressed gasket will force the male member outwardly slightly in a longitudinal direction and will seat its locking lugs between the stop lugs and ends of the recesses and against the flange 15, in which position the parts will be yieldingly held by the compressed gasket.

In order to uncouple the parts it will be first necessary to force the members together in a longitudinal direction, thereby further compressing the gasket, and when the locking lugs have cleared the stop lugs, the male member may be turned to bring the locking lugs opposite the longitudinal slots, when the two members may be drawn apart. It will be seen therefore that the gasket performs the double function of holding the parts of the coupling yieldingly interlocked, and of sealing the inter-fitting parts liquid-tight. Further, it will be seen that by reason of the fact that the gasket is inclosed between the opposite shoulders on the male and female members, and the opposing surfaces on said members, it is practically isolated from contact of the fluid therewith, so that the liability of the latter finding its entrance between the parts is reduced to a minimum. Further, by reason of the fitting of the enlarged and reduced portions of the male member within the corresponding bores of the female member, the parts are properly centered in the coupling action, and are held in fixed rigid relations when coupled.

The device as a whole is of extreme simplicity, comprising but three parts, and when the members are coupled together, the connection is rigid, strong and fluid-tight, and free from projecting parts, such as bolts, bands and the like.

In order to facilitate the coupling and uncoupling actions, the two members may be provided with roughened or angular portions, such as the hexagonal heads as shown.

In the accompanying drawings I have illustrated my invention in the specific form which I prefer to adopt and which has been found in practice to answer admirably the ends to be attained, but it will be understood that the invention is not limited to any particular form or construction of the parts except in so far as such limitations are specified in the claim.

Having thus described my invention, what I claim is:—

In a pipe coupling, the combination of a male member provided with a locking lug, an annular shoulder, a reduced neck adjoining the shoulder and a terminal centering head, a gasket surrounding the neck between the shoulder and head, a female member provided at one end with an annular flange, an enlarged bore to receive the shoulder and gasket, and having a reduced bore to receive the terminal head, the said female member being provided with a longitudinal slot to receive the locking lug and with a circumferential recess extending through its side, one wall of which recess is formed by the said annular flange, and into which recess said locking lug is adapted to be turned, and a stop lug in the recess between the longitudinal slot and the end of the recess, with which stop lug the locking lug is adapted to be interlocked between it and the end of the recess and in forcible engagement with the flange.

In testimony whereof I hereunto set my hand this 23rd day of November, 1910, in the presence of two attesting witnesses.

FREDERICK J. GLOVER.

Witnesses:
OTTO UNSLEBEN,
LUTHER KESSLER.